US009079101B2

(12) United States Patent
Yukishita et al.

(10) Patent No.: US 9,079,101 B2
(45) Date of Patent: *Jul. 14, 2015

(54) VIDEO GAME WHERE PLAYERS COMPETE TO OCCUPY AREAS

(71) Applicant: DeNA Co., Ltd., Tokyo (JP)

(72) Inventors: Shinnosuke Yukishita, Tokyo (JP); Takahiro Yamaguchi, Tokyo (JP); Hiroko Kusuhara, Tokyo (JP)

(73) Assignee: DENA CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,593

(22) Filed: Jun. 30, 2014

(65) Prior Publication Data

US 2014/0315612 A1 Oct. 23, 2014

Related U.S. Application Data

(63) Continuation of application No. 14/012,962, filed on Aug. 28, 2013, now Pat. No. 8,764,535.

(30) Foreign Application Priority Data

Aug. 31, 2012 (JP) ................................. 2012-192498

(51) Int. Cl.
*A63F 9/08* (2006.01)
*A63F 13/00* (2014.01)
(Continued)

(52) U.S. Cl.
CPC ................. *A63F 13/00* (2013.01); *A63F 13/10* (2013.01); *A63F 13/45* (2014.09); *A63F 13/52* (2014.09); *A63F 13/55* (2014.09); *A63F 13/822* (2014.09); *A63F 2300/6009* (2013.01); *A63F 2300/61* (2013.01)

(58) Field of Classification Search
CPC ......... A63F 13/10; A63F 13/45; A63F 13/48; A63F 13/55; A63F 13/58; A63F 13/822
USPC .................................................... 463/9–11, 42
See application file for complete search history.

(56) References Cited

U.S. PATENT DOCUMENTS 5,743,796 A * 4/1998 Orak et al. ........................ 463/9
6,481,715 B1 * 11/2002 Callan ............................ 273/237
(Continued)

OTHER PUBLICATIONS

"Risk II Manual", [dated 2000]. [online], [retrieved Nov. 2, 2014]. Retrieved from the Internet <URL:http://www.replacementdocs.com/download.php?view.1581>. 19 pages.*
(Continued)

*Primary Examiner* — Lawrence Galka
(74) *Attorney, Agent, or Firm* — Pillsbury Winthrop Shaw Pittman, LLP

(57) ABSTRACT

If an area in which a character has been already placed by a player in another team is selected from the areas displayed in a game field display part on a top screen and a player point count corresponding to Oshikura at the bottom of as PP selection part is selected, a comparison is made between a player point count that was selected by a player at the placement of the currently placed character and a player point count that was selected by a player who will place a new character. Then, the character related to a player having more player points is determined as the character to be placed in the area. Accordingly, more competitive game elements are realized in a game that uses multiple areas.

10 Claims, 7 Drawing Sheets

(51) Int. Cl.
*A63F 13/45* (2014.01)
*A63F 13/52* (2014.01)
*A63F 13/822* (2014.01)
*A63F 13/55* (2014.01)
*A63F 13/40* (2014.01)

(56) References Cited

U.S. PATENT DOCUMENTS

| | | | | |
|---|---|---|---|---|
| 6,568,683 | B1 * | 5/2003 | Harpaz | 273/460 |
| 7,059,964 | B1 * | 6/2006 | Harpaz | 463/9 |
| 7,077,744 | B2 * | 7/2006 | Cannon | 463/20 |
| 7,147,555 | B1 * | 12/2006 | Harpaz | 463/9 |
| 7,147,556 | B1 * | 12/2006 | Harpaz | 463/9 |
| 2003/0008696 | A1 * | 1/2003 | Abecassis et al. | 463/9 |
| 2008/0045343 | A1 * | 2/2008 | Sauberman | 463/42 |
| 2013/0084928 | A1 * | 4/2013 | Kasai | 463/9 |
| 2013/0273988 | A1 * | 10/2013 | Taki et al. | 463/9 |

OTHER PUBLICATIONS

Japanese Office Action in connection with Japanese Patent Application No. JP2012-192498 issued on May 7, 2013.
"Nouen Hokkorina," http:.f.fwww.facebook.com/Hokkorina?from=fb_fm, retrieved Apr. 5, 2013.
Studio Survive, Culdcept DS Official Guidebook [Cards and Tactics], Media Factory, Inc., Oct. 16, 2008, First Edition, pp. 15-38.

* cited by examiner

Character Management Table 52a

| Character ID | Standard Calorie Intake Speed |
|---|---|
| C000001 | 100 |
| C000002 | 100 |
| C000003 | 200 |
| C000004 | 100 |
| C000005 | 300 |
| C000006 | 100 |
| C000007 | 200 |
| ... | ... |

Area Management Table 52b

| Area ID | Game Field ID | Intra-field Position | Standard Calories | Remaining Calories |
|---|---|---|---|---|
| A000001 | F00001 | 11 | 500 | 200 |
| A000002 | F00001 | 12 | 1500 | 800 |
| A000003 | F00001 | 13 | 1000 | 500 |
| A000004 | F00001 | 14 | 500 | 0 |
| A000005 | F00001 | 15 | 1500 | 300 |
| ... | ... | ... | ... | ... |
| A000027 | F00002 | 22 | 500 | 0 |
| A000028 | F00002 | 23 | 500 | 200 |
| ... | ... | ... | ... | ... |

Fig. 5

Character Placement Management Table 52c

| Area ID | Character ID | Player ID | PP used | Taken Calories | Placement Time |
|---|---|---|---|---|---|
| A000001 | C000007 | P000004 | 1pp | 400 | 21:04:12 |
| A000002 | C000002 | P000001 | 3pp | 100 | 21:07:05 |
| A000003 | C000005 | P000002 | 2pp | 900 | 21:01:42 |
| A000004 | C000004 | P000002 | 2pp | 700 | 21:05:22 |
| A000005 | C000003 | P000003 | 1pp | 800 | 21:03:57 |
| ... | ... | ... | ... | ... | ... |

Fig. 6

Player Management Table 52d

| Player ID | Held PP | Game Field ID | Team ID | Character ID | Cumulative Calories |
|---|---|---|---|---|---|
| P000001 | 3 | F00001 | T000001 | C000002 | 900 |
| P000002 | 1 | F00001 | T000002 | C000012 | 200 |
| P000003 | 2 | F00001 | T000001 | C000001 | 1200 |
| P000004 | 0 | F00001 | T000002 | C000009 | 300 |
| P000005 | 3 | F00001 | T000002 | C000004 | 600 |
| P000006 | 1 | F00003 | T000003 | C000007 | 500 |
| P000007 | 1 | F00003 | T000003 | C000006 | 100 |
| ... | ... | ... | ... | ... | ... |

FIG. 7

VIDEO GAME WHERE PLAYERS COMPETE TO OCCUPY AREAS

CROSS-REFERENCE TO RELATED APPLICATIONS

This application is based on and claims the benefit of priority from Japanese Patent Application Serial No. 2012-192498 (filed on Aug. 31, 2012), the contents of which are hereby incorporated by reference in their entirety.

FIELD OF THE INVENTION

The present invention relates to a game providing device that provides a game.

BACKGROUND

Recently known games played by using a mobile telephone terminal, a personal computer, a game console, or the like are games in a category of so-called farm games (see Nouen Hokkorina, Online, DeNA Co., Ltd., searched for on Aug. 7, 2012, Internet <http://www.facebook.com/Hokkorina?from=fb fm>, for example). In these games, seeding, watering, harvesting, cultivating, and other actions are repeatedly carried out in each of a plurality of frame-like areas constituting a virtual farm as a field so that harvest of crops can be enjoyed in the virtual farm.

SUMMARY

Although, in these farm games, the player can compete against another player in terms of, for example, the number of crops harvested from the virtual farm, it is difficult for the player to enjoy more competitive game elements as in a battle with another player or a virtual character in a game, the battle being realized in a so-called card game. It is desirable to provide a game that enables players to enjoy more competitive game elements while the game maintains game characteristics realized in farm games.

An object of the present invention is to achieve more competitive game elements in a game in which a plurality of areas are used. Other objects of the present invention will be clarified by reference to the whole of this description.

A game providing device in an embodiment of the present invention is a game providing device for providing a game, the device comprising: a content information storage unit configured to store information about a plurality of game contents used in a game; an area information storage unit configured to store information about a plurality of areas, wherein the plurality of game contents are to be placed in the plurality of areas, a content determining unit configured to determine, in response to a request from each of a plurality of players including a first player and a second player, a game content available to the player from the plurality of game contents stored in the content information storage unit; an area selection accepting unit configured to accept, from each of the plurality of players, a selection of an area from the plurality of areas stored in the area information storage unit, wherein the determined game content is to be placed in the selected area; a content placing unit configured to place a game content in an area selected by the first player if the area has no game content placed therein, the game content being determined by the content determining unit and available to the first player, and to perform placing processing based on a comparison between a first parameter corresponding to game content placement by the first player and a second parameter corresponding to game content placement by the second player, if the area selected by the first player is a competing area having a game content placed therein by the second player; a point granting unit configured to grant points corresponding to the area to a player, in response to the placement of the game content in the area by the player; and a result deciding unit configured to decide a result of the game according to points granted to each of the plurality of players.

A method in an embodiment of the present invention is a method using a computer to function as a game providing device for providing a game, the computer being operable to access a content information storage unit configured to store information about a plurality of game contents used in a game and an area information storage unit configured to store information about a plurality of areas, wherein the plurality of game contents are to be placed in the plurality of areas, the method comprising the steps: determining, in response to a request from each of a plurality of players including a first player and a second player, a game content available to the player from the plurality of game contents store in the content information storage unit; accepting, from each of the plurality of players, a selection of an area from the plurality of areas stored in the area information storage unit, wherein the determined game content is to be placed in the selected area; placing a game content in an area selected by the first player if the area has no game content placed therein, the game content being determined by the content determining unit and available to the first player, and performing placing processing based on a comparison between a first parameter corresponding to game content placement by the first player and a second parameter corresponding to game content placement by the second player, if the area selected by the first player is a competing area having a game content placed therein by the second player; granting points corresponding to the area to a player, in response to the placement of the game content in the area by the player; and deciding a result of the game according to points granted to each of the plurality of players.

Various embodiments of the present invention can realize more competitive game elements in a game in which a plurality of areas are used.

BRIEF DESCRIPTION OF THE DRAWINGS

FIG. 5 is an example of an area management table in an embodiment of the present invention.

FIG. 6 is an example of a character placement management table in an embodiment of the present invention.

FIG. 7 is an example of a player management table in an embodiment of the present invention.

DESCRIPTION OF THE PREFERRED EMBODIMENTS

Figure 1:
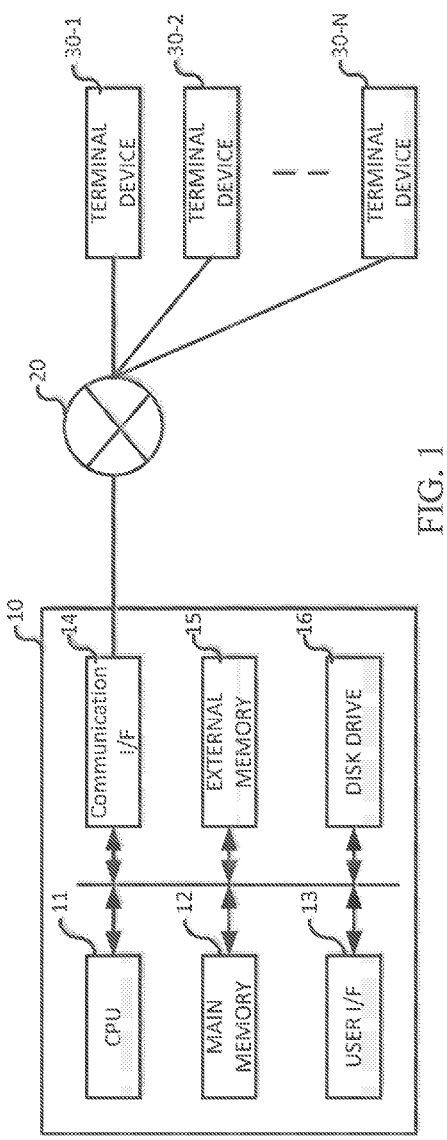
FIG. 1 is a block diagram schematically illustrating a game system that includes a server device in an embodiment of the present invention.

Various embodiments of the present invention will be described appropriately with reference to the drawings. In these drawings, like elements are denoted by like reference characters.

FIG. 1 is a block diagram schematically illustrating a game system that may include a server device 10, intended for an online game, that may function as a game providing device in an embodiment of the present invention. As illustrated in FIG. 1, the server device 10 intended for an online game (sometimes which will be simply referred to below as the server device 10) may be connected through a communication network 20 such as the Internet to terminal devices 30-1, 30-2, . . . , 30-N (sometimes which will be collectively referred to below as the terminal devices 30) so that the server device 10 can communicate with these terminal devices 30.

The server device 10 may include a central processing unit (CPU) 11, a main memory 12, a user interface 13, a communication interface 14, an external memory 15, and a disk drive 16, as illustrated in FIG. 1. These components may be electrically connected to one another through a bus 17. The CPU 11 may load, into the main memory 12, an operating system and other various programs that may control the progress of an online game from the external memory 15, and may execute commands included in the loaded programs. The main memory 12 may be used to store programs executed by the CPU 11; an example of the main memory 12 may be a dynamic random access memory (DRAM).

The user interface 13 may include, for example, an information input device, such as a keyboard or a mouse, that accepts inputs from an operator and an information output device, such as a liquid crystal display, to which an arithmetic result is output from the CPU 11. The communication interface 14 may be implemented as hardware, firmware, or communication software such as a Transmission Control Protocol/Internet Protocol (TCP/IP) driver or a Point-to-Point (PPP) driver, or their combination; the communication interface 14 may be structured so that it can communicate with the terminal devices 30 through the communication network 20.

The external memory 15 may be, for example, a magnetic disk drive; the external memory 15 may store various programs including a control program that controls the progress of an online game. Various types of data used in the game may be stored in the external memory 15. Instead of being stored in the external memory 15, the various types of data stored may be stored in a database server, which may be a body physically separated from the server device 10 and may be connected to the server device 10 so that it can communicate with the server device 10. The disk drive 16 may read data stored in a compact disc-read-only memory (CD-ROM), a digital versatile disc-ROM (DVD-ROM), a DVD-recordable (DVD-R), and other various types of storage media or may write data in these storage media. For example, a game application and date such as game data, which have been stored in a storage medium, may be read by the disk drive 16 and may be installed in the external memory 15.

In an embodiment, the server device 10 may be a web server that may manage a web site formed with a plurality of web pages in a hierarchical structure. The server device 10 can provide a service to the terminal device 30. The terminal device 30 can obtain Hypertext Markup Language (HTML) data used to display web pages from the server device 10, can analyze the obtained HTML data, and can provide the web pages to the user (player of a game) of the terminal device 30. Sometimes, a game provided through this type of web pages may be referred to as a browser game. HTML data used to display these web pages may also be stored in the external memory 15. The HTML data is formed with an HTML document written in HTML or another markup language. Various images may be associated with the HTML document. A program written in ActionScript (registered trademark), JavaScript (registered trademark), or another script language can be embedded in the HTML document.

A game application executed on the terminal device 30 in an execution environment other than browser software can also be stored in the external memory 15. This game application can include a game program used to execute a game and various types of data, such as image data, referenced during execution of the game program. The game program may be written in, for example, Objective-C (registered trademark), Java (registered trademark), or another object-oriented programming language. The created game program may be stored in the external memory 15 as application software together with the various types of data. The application software stored in the external memory 15 may be distributed to terminal devices 30 in response to distribution requests. The application software distributed from the server device 10 may be received at each terminal device 30 through the communication interface 34 under control by the CPU 31. The received application software may be transmitted to the external memory 35 and may be stored therein. The application software may be activated in response to a manipulation by the player on the terminal device 30 and may be executed on NgCore (trademark). Android (trademark), or another platform implemented in the terminal device 30. The server device 10 may provide various types of data required for the progress of the game to the game application while it is being executed on the terminal device 30. The server device 10 can also store various types of data transmitted from the terminal device 30 to manage the progress of the game for each player.

When the server device 10 manages a web site that provides a game service and distributes web pages constituting the web site in response to a request from the terminal device 30 as described above, the server device 10 can advance the game. The server device 10 can also advance a game according to communication with a game application executed on the terminal device 30, instead of this browser game or in addition to the browser game. Regardless of an aspect in which the server device 10 provides a game, the server device 10 can store data required for the progress of a game for each identification information item that identifies a player. Although details will be omitted, the server device 10 can also have functions to perform player authentication processing at the start of a game and accounting processing generated as the game advances. Games provided by the server device 10 may include an action game, role-playing game, a baseball game, a card game, and other games. The types of games realized by the web site or game application provided by the server device 10 are not restricted to the types clarified in this description.

In an embodiment, the terminal device 30 may be an arbitrary information processing device that can obtain a game web site from the server device 10 and can display the web pages of the obtained web site in a web browser. Examples of the terminal device 30 may include a mobile telephone, a smart phone, a game console, a personal computer, a touch pad, and a digital book reader, but the terminal device 30 is not restricted to these examples. In another embodiment, the terminal device 30 may be an arbitrary information processing device in which an application execution environment to execute a game application is implemented.

Figure 2:
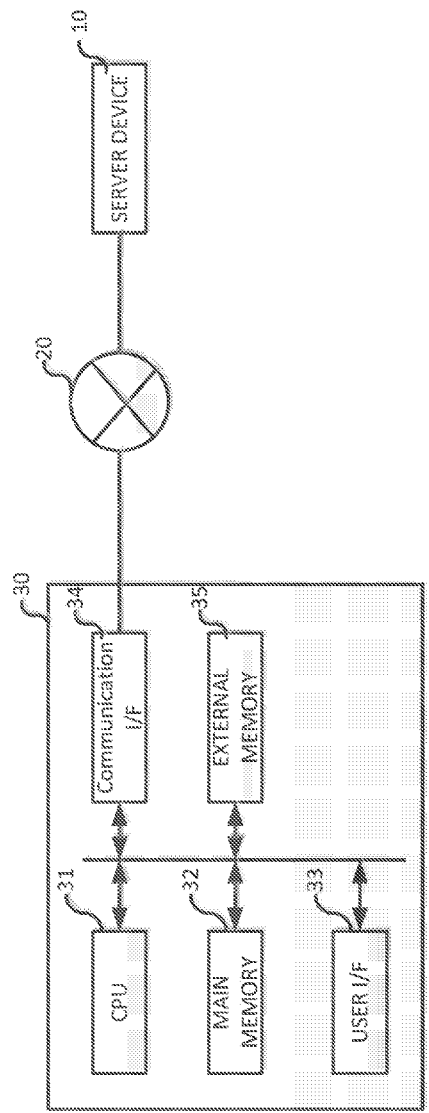
FIG. 2 is a block diagram, conceptually illustrating the architecture of a terminal device connected to the server device in an embodiment of the present invention.

The architecture of the terminal device 30 will be described with reference to FIG. 2. FIG. 2 is a block diagram conceptually illustrating the architecture of the terminal device 30. The terminal device 30 may include a CPU 31, a main memory 32, a user interlace 33, a communication interface 34, and an external memory 33 as illustrated in FIG. 2. These components may be electrically connected to one another through a bus 36.

The CPU 31 may load an operating system and other various programs from the external memory 35 into the main memory 32, and may execute commands included in the loaded programs. The main memory 32 may be used to store programs executed by the CPU 31; an example of the main memory 32 may be a DRAM.

The user interface 33 may include, for example, an information input device, such as a touch panel, a keyboard, buttons, or a mouse, that accepts inputs from a player (user) and an information output device, such as a liquid crystal display, to which an arithmetic result is output from the CPU 31. The communication interface 34 may be implemented as hardware, firmware, or communication software such as TCP/IP driver or a PPP driver, or their combination; the communication interface 34 may be structured so that it can communicate with the server device 10 through the communication network 20.

The external memory 35 may be for example, a magnetic disk drive, a flash memory, or the like; the external memory 35 may store an operating system and other various programs. When a game application is received through the communication interface 34 from the server device 10, the external memory 35 may also store the received game application.

The terminal device 30, which may have the architecture as descried above, may have browser software that may interpret a file in, for example, HTML format (HTML data) and may display the file on a screen. A function of this browser software can be used to interpret the HTML data received from the server device 10 and display a web page corresponding to the received HTML data. The terminal device 30 may also have plug-in software (Flash Player provided by Adobe Systems Incorporated, for example) to be embedded into in the browser software, so it can obtain a file in small web format (SWF), which has been embedded in HTML data, from the server device 10 and can execute the SWF-format file by using the browser software or plug-in software.

When a game is executed on the terminal device 30, program-commanded animation or manipulation icons, for example, may be displayed on a screen of the terminal device 30. The player can use an input interface (a touch screen or buttons, for example) of the terminal device 30 to enter a command to advance the game. The command entered by the player may be transmitted to the server device 10 through the browser in the terminal device 30 or a function of NgCore (trademark) or another platform.

Figures 3, 4:
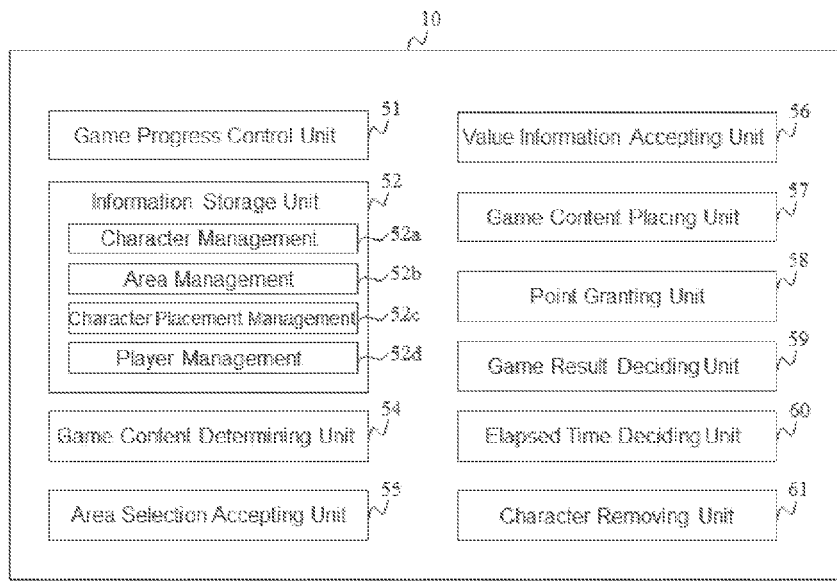
FIG. 3 is a block diagram, illustrating functions of the server device in an embodiment of the present invention.
FIG. 4 is an example of a character management table in an embodiment of the present invention.

Next, functions of the server device 10 realized by the constituent elements illustrated in FIG. 1 will be described. FIG. 3 is a block diagram illustrating functions of the server device 10 in an embodiment of the present invention. As illustrated in FIG. 3, the server device 10 in this embodiment may have a game progress control unit 51 that may control the progress of a game, an information storage unit 52 that may store various types of tables used to advance the game, a game content determining unit 54 that may determine a game content available to a player from a plurality of game contents; an area selection accepting units 55 that may accept an area selected by a player as an area in which to place the game content determined by the game content determining unit 54, a value information accepting unit 56 that may accept value information entered by a player for a placement of a game content, a game content placing unit 57 that may place a game content in an area selected by a player, a point granting unit 58 that may grant points to a player in correspondence to placement of a game content in an area, a game result deciding unit 59 that may decide a result of a game according to points granted to each player, an elapsed time deciding unit 60 that may make a decision about an elapsed time from placement of a game content in an area, and a character removing unit 61 that may remove a game content when a predetermined condition holds. These functions may be realized through cooperation between the CPU 11 and programs, tables and the like that have been stored in the main memory 12 and external memory 15.

The game progress control unit 51 can transmit and receive data required to advance a game to and from the terminal device 30 and can control the progress of the game for each player by managing the data for each player. For example, the game progress control unit 51 may sequentially display, on the terminal device 30, web pages constituting a web site that provides a game service in response to a request from the terminal device 30. When a hyperlink on a displayed web page is selected by the player the game progress control unit 51 may transmit new HTML data corresponding to the selected hyperlink to the terminal device 30. A web page based on this new HTML data may be displayed on the terminal device 30. Since web pages stored in the server device 10 are sequentially provided by the game progress control unit 51 to the terminal device 30 in response to a manipulation by a player in this way, the player can use a function of the game progress control unit 51 to advance the game according to a manipulation by the player.

When a game application is executed on the terminal device 30, the game progress control unit 51 can transmit various types of data used in the game to the game application. When, for example, the game progress control unit 51 receives, from a game application in the terminal device 30, a control signal indicating that a prescribed mission has been cleared, the game progress control unit 51 may transmit various parameters related to a next mission after the cleared mission to the game application. The game application can load the data provided by the server device 10 and can advance the game.

The terminal device 30 can use a function of browser software or a game application to appropriately transmit to the server device 10, information indicating various parameter values used in a game (such as the number of obtained game points and information related to obtained items), information indicating a status (such as information identifying an achieved mission), and other information related to the progress of the game. The game progress control unit 51 can store, for each player, information related to the progress of the game received from a plurality of terminal devices 30 in control the progress of the game for each player. When a player logs in to the server device 10 by using the ID of the player, therefore, the game may be restarted from a stage corresponding to the progress of the player (stage immediately before the interruption, for example) according to the information, related to the progress of the game, that the server device 10 may retain in correspondence to the player. The information required for the progress of a game may also be managed by other various functions of the server device 10 besides the game progress control unit 51, as described later.

Examples of various games provided to the server device 10 may include a so-called card game, in which players use their own electronic cards to play against other players, and a role-playing game that advances through a play between a player character and a competition character. An embodiment of the present invention may provide an area capturing game, in which a plurality of players joining in a game may play against one another by placing a game content in each of a plurality of areas constituting a game field and obtaining points corresponding to the area, as one of games that can be provided.

As tables used to advance the area capturing game, the information storage unit 52 may store a character management table 52a that may manage information related to characters, which are game contents used in the game, an area management table 52b that may manage information related to areas in which to place characters, a character placement management table 52c that may manage information related to character placement in areas, and a player management table 52d that may manage information related to players joining in the game.

FIG. 4 illustrates an example of the character management table 52a. In correspondence to a character ID, which identifies a character, the character management table 52a may store a standard calorie intake speed, which is a parameter value possessed by the character, and other information, as illustrated in FIG. 4. In the area capturing game in this example, each area may be represented by food (creme caramel, for example) and points obtained by a player may be represented by food consumption (calorie intake) by a character (bear, for example). Accordingly, the standard calorie intake speed managed in the character management table 52a indicates a speed at which points are obtained by each character.

FIG. 5 illustrates an example of the area management table 52b. In correspondence to an area ID, which identifies an area, the area management table 52b may store a game field ID, which identifies a game field to which the area belongs, an intra-field position, which indicates position coordinates of the area in the game field, standard calories indicating calories at the start of the game, remaining calories that remain in the area, and other information, as illustrated in FIG. 5. Although details will be described later, the value of the standard calories may be set as the remaining calories at the start of the game. When each player takes calories (obtains points) during the progress of the game, the taken calories may be subtracted. Although each area is identified by an area ID, it can also be identified by a combination of a game field ID and an intra-field position.

FIG. 6 illustrates an example of the character placement management table 52c. In correspondence to an area ID, which identifies an area, the character placement management table 52c may store a character ID, which identifies a character placed in the area at that time, a player ID, which identifies a player who has placed the character in the area, PP used, which indicates the number of player points (PP) as value information entered by the player at the placement of the character in the area, taken calories, which are calories taken by the placed character while in this area, a placement time at which the character was placed in this area, and other information, as illustrated in FIG. 6.

FIG. 7 illustrates an example of the player management table 52d. In correspondence to a player ID, which identifies a player the player management table 52d may store held PP, which indicates the number of player points (PP) that is being held by the player and is usable in the area capturing game, a field ID, which identifies a game field in the area capturing game in which the player is joining, a team ID, which identifies a team to which the player belongs, a character ID, which identifies a character usable to the player at that time, cumulative calories, which indicate a cumulative value of calories that the player has taken in the game field in the area capturing game in which the player is joining, and other information, as illustrated in FIG. 7.

Figure 8:
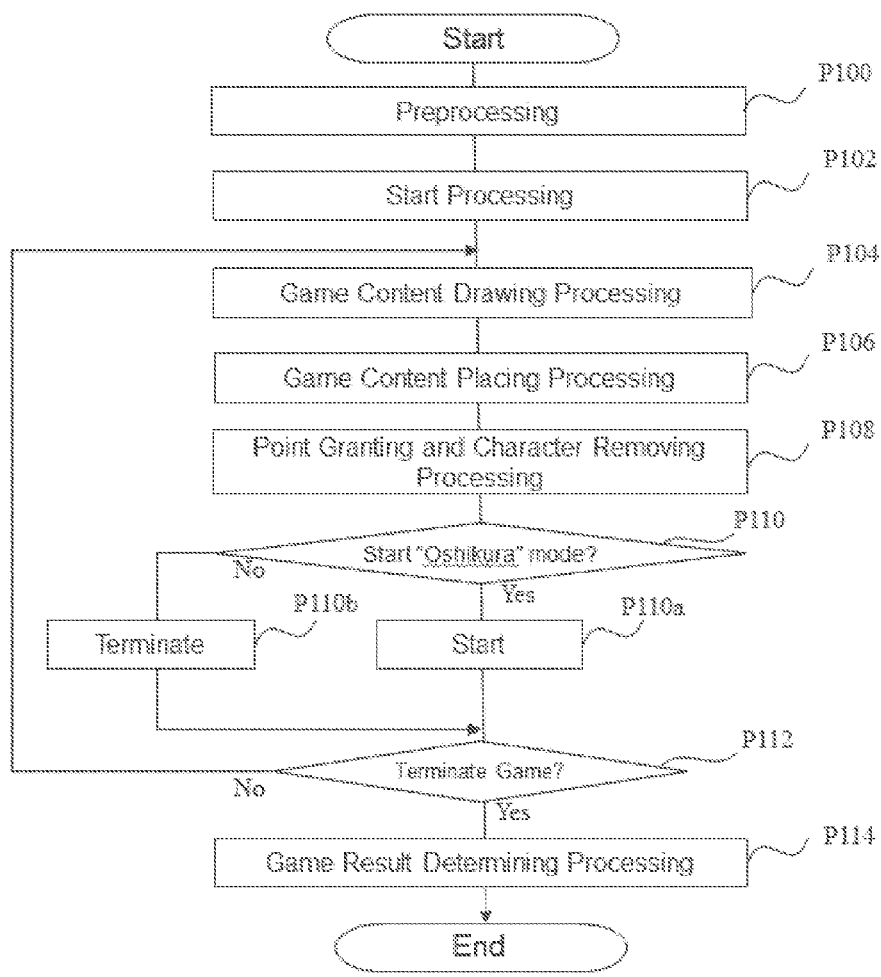
FIG. 8 is a flowchart illustrating game processing in an embodiment of the present invention.

Next, operation of the server device 10, structured as described above, in an embodiment of the present invention will be described. FIG. 8 is a flowchart illustrating an example of game processing executed by the server device 10, in the game processing, preprocessing, in which various processes required before a game is started are performed, may be first executed (step P100). Examples of various processes performed in the preprocessing may include a process to provide date indicating that an area capturing game will be started to the terminal device 30 of a player who is executing another game provided by the server device 10, a process to accept a registration of participation to the area capturing game from the terminal device 30, and a process to accept (fete requesting formation of a team from the terminal devices 30 of individual players and manage the formation of a team. Although details are omitted when formation of a team Is managed the team ID of a team to which players belongs may be set in the team ID field of the player management table 52d.

If a condition to start the area capturing game holds, start processing, in which various processes required to start the game are performed, may be executed (step P102). An example of the condition to start the area capturing game may be that a time predetermined by a game provider that provides the game is reached. Examples of various processes performed in the start processing may include a process to provide data indicating a start of the area capturing game to the terminal devices 30 of the players for whom participation has been registered in advance and a process to make a setting so that a top screen, described later, of the area capturing game can be provided to the terminal devices 30 of the players.

After the start processing in step P102 has been executed, game content drawing processing (step P104), in which a game content (character) is determined by drawing in response to a request from the terminal device 30 of each player game content placing processing (step P106), in which the game content is placed in an area, and point granting and character removing processing (step P108), in which points are granted to players and the game content is removed, are repeatedly executed until the game is terminated.

Figure 9:
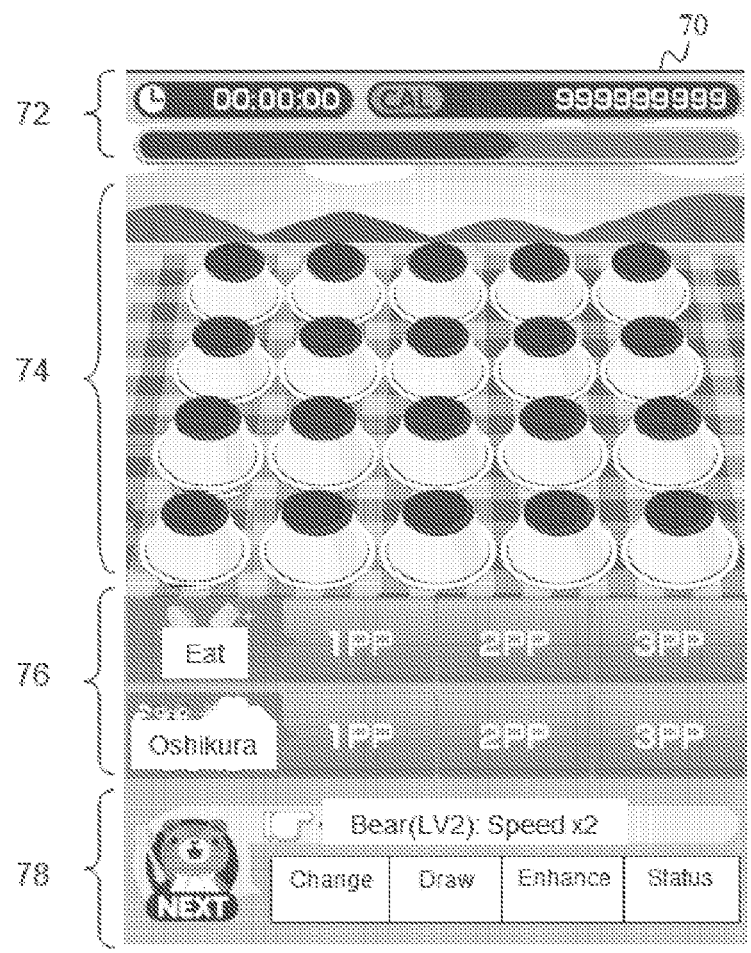
FIG. 9 illustrates an example of a top screen displayed in the terminal device in an embodiment of the present invention.

The top screen 70 illustrated in FIG. 9 will now be described, the top screen 70 being a basic screen to play the area capturing game. As described above, when the start processing in step P102 is executed the top screen 70 can be provided to the terminal device 30 of each player. The top screen 70 may include a basic information display part 72, in which a remaining time in the game and a cumulative calories of the player are displayed, a game field display part 74, in which a game field including a plurality of areas is displayed a PP selection part 76, in which choices of action and choices of player point counts used as value information to be entered are displayed so as to be selected when the character is placed in the area, and a character display part 78, in which information related to characters usable to the player at that time is displayed, from the top of the screen toward the bottom as illustrated in FIG. 9. In this example, the game field is represented as 20 creme caramels in a matrix of four rows and five columns. The PP selection part 76 includes player point counts corresponding to Eat at the top and player point counts corresponding to Oshikura at the bottom, as illustrated in FIG. 9. When one of the point counts at the top and bottom is selected, a type of action can also be selected.

Referring again to the flowchart in FIG. 8, in the game content drawing processing (step P104), when data requesting determination of a character to be placed in an area by drawing is received from the terminal device 30 of a player, a character may be determined from the characters managed in the character management table 52a by drawing, and the determined character may be displayed in the character display part 78 on the top screen 70 on the terminal device 30 of the player who has requested drawing. The character ID of the determined character may be stored in the player management table 52d in correspondence to the player ID of the player who has requested drawing. Various methods can be used to determine a character by drawing. For example, pseudo random numbers generated in a pseudo random number generation method can be used. On the character display part 78 on the top screen 70 in an embodiment, information related to the calorie intake speed of the determined character may be displayed together with a picture of the character (in the example in FIG. 9, "Speed×2" is displayed, indicating that the calorie intake speed is twice (200 calories/minute) 100 calories/minute, which is the calorie intake speed of a normal character).

In the game content placing processing (step P106), data used to select an area in which to place the character and data that indicates a type of action taken when the character is placed and also indicates player points used in the placement of the character may be received from the terminal device 30, after which the character placement management table 52c may be updated with the received data. The data received from the terminal device 30 may be data transmitted according to a manipulation by the player on the top screen 70.

Figure 10:
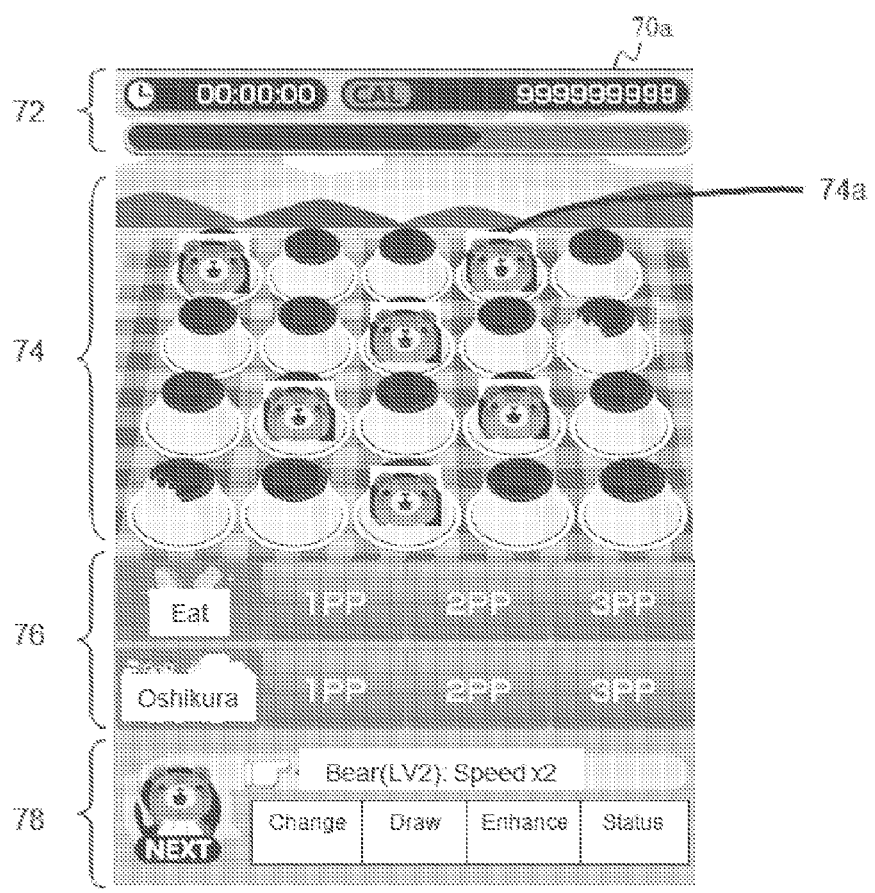
FIG. 10 illustrates another example of a top screen displayed in the terminal device in an embodiment of the present invention.

A manipulation made by the player on the top screen 70 will be described below in detail. On the top screen 70, the player may first select a desired area from the choices displayed in the game field display part 74 as the area in which to place the character displayed in the character display part 78. In the example in FIG. 9, a character is not placed, in any of the areas displayed in the game field display part 74. If an area in which a character is not placed is selected, player point counts corresponding to Eat at the top of the PP selection part 76 on the top screen 70 become selectable. FIG. 10 illustrates an example of a top screen 70a displayed when a predetermined time has passed after the start of the game. If an area (area 74a, for example) in which a character has been already placed by a player in another team is selected from the areas displayed in the game field display part 74 on the top screen 70a, player point counts corresponding to Oshikura at the bottom of the PP selection part 76 become selectable. When, as described above, a player selects a desired area from the areas displayed in the game held display part 74 and selects a player point count corresponding to the action type determined according to whether a character has been already placed in the selected area, data to select an area in which to place a character and data indicating the action type and player point count are transmitted from the terminal device 30. In the game field display part 74, a player cannot select an area in which a character has been already placed by another player in the team including the player or an area in which the remaining calorie is zero, and a character placed by a player in another team and a character placed by a player in the team including the player can be distinguished by, for example, colors. Data sent from the terminal device 30 to select an area may be position coordinates on the game field. In the PP selection part 76, a player can select a point count within the range of the player points held by the player (the player points are managed as the held PP in the player management table 52d). If, for example, the number of player points held by a player is 2PP, the player cannot select 3PP from the PP selection part 76. The player point counts corresponding to the action Oshikura can be selected only when a predetermined condition is true and an Oshikura mode has been entered which will be described later in detail.

Next, a method of determining a character to be placed in an area will be described in detail. When a player point count corresponding to Oshikura, which is one of two actions in the PP selection part 76, is selected, a character to be placed in this area may need to be selected. In an embodiment, a comparison may be made between a player point count (managed as the PP used in the character placement management table 52c) that was selected by a player in another team at the placement of the currently placed character and a player point count that was selected by a player who will place a new character (player who will execute the action Oshikura), and the character related to a player having more player points is determined as the character to be placed in the area. If the player who will place a new character has more player points than the player in the other team, the already placed character may be removed and the new character is placed. If the player who placed the currently placed character has more player points than the player who will place a new character, the currently placed character continues to be placed. In an embodiment, if the two players have the same number of player points, the currently placed character may be removed (that is, either character may not be placed). If a player point count corresponding to Eat, which is the other of the two actions in the PP selection part 76, is selected, a new character may be placed in the selected area.

The character placement management table 52c may be updated specifically by obtaining, from the area management table 52b, the area ID corresponding to the intra-field position and the game field ID (managed in the player management table 52d) of the game field in the area capturing game in which the player is joining and by setting the player ID of the player and the character ID (managed in the information storage unit 52) of the character to be placed in the character placement management table 52c in correspondence to the area ID. In the character placement management table 52c, the player point count received from the terminal device 30 may be set in the PP used field, the current time may be set in the placement time field, and an upper limit (15 minutes, for example) of a time during which the character can stay in this area may be set in the remaining time field. Zero may be set in the taken calories field because the character has not taken calories at that time. When an already-placed character continues to be placed as the result of the execution of the action Oshikura, the character placement management table 52c may is updated. When an already-placed character is removed, the relevant record is deleted.

In the point granting and character removing processing (step P108), calorie intake by the character during the elapsed time from the placement of the character in the area may be calculated from information managed in the character placement management table 52c and the character may be removed. The elapsed time from the placement of the character in the area can be calculated from the current time and the placement time in the character placement management table 52c.

In an embodiment, the calorie intake may be calculated at one-minute intervals from the standard calorie intake speed (stored in the character management table 52a) of the character and the PP used (stored in the character placement management table 52c), which is player points used in the placement of the character. If the PP used is 1PP, the calorie intake at one-minute intervals may be the same as the standard calorie intake speed of the character. For example, if the standard calorie intake speed of the character is 100 calories per minute, the calorie intake may be 100 calories; if the standard calorie intake speed of the character is 200 calories per minute, the calorie intake may be 200 calories.

In an embodiment, the standard calorie intake speed of the character can be changed according to the value of the PP used. For example, if the PP used is 1PP, the standard calorie intake speed may remain unchanged; if the PP used is 2PP, the standard calorie intake speed may be doubled; if the PP used is 3PP, the standard calorie intake speed may be quadrupled. That is, even if identical characters at a standard calorie intake speed of 100 calories per minute are placed, when the PP used is 1PP, 100 calories may be taken each time one minute elapses; when the PP used is 2PP; 200 calories may be taken each time one minute elapses; when the PP used is 3PP 400 calories may be taken each time one minute elapses. In another embodiment, the remaining calories may change depending on the value of the PP used. For example, if the PP used is 1PP, the remaining calories may remain unchanged; if the PP used is 2PP, the remaining calories may be doubled; if the PP used is 3PP the remaining calories may be quadrupled. Whether the standard calorie intake speed of the character of the remaining calories in the area are changed according to the PP used may be determined by the player or the character to be placed (that is, there may be characters that change the standard calorie intake speed and characters that change the remaining calories). Furthermore, it may be possible to change both the standard calorie intake speed of the character and the remaining calories in the area according to the value of the PP used. In this case, rates in change (magnifications in increase) for the standard calorie intake speed and the remaining calories change, for example, may be set so that they match.

The calorie intake calculated in this way may be added to the taken calories in the character placement management table 52c. Since the remaining calories in the area are reduced by the calorie intake, the calorie intake is subtracted from the remaining calories in the area management table 52b. Since the cumulative calories of the player are increased, the calorie intake is added to the cumulative calories in the player management table 52d.

In an embodiment in the point granting and character removing processing (step P108), a character may be removed when the elapsed time from when the character was placed in the area reaches a predetermined upper time (15 minutes, for example). In an embodiment, a character may also be removed when the remaining calories in the area fall to zero (that is, the cumulative value of calories taken by characters placed by individual players reaches the standard calories in the area) even before the elapsed time reaches the upper limit. A character may also be removed at another timing. Specifically a character may be removed by deleting a relevant record in the character placement management table 52c, as described above.

In an embodiment, if the remaining calories in an area fall to zero as a result of calorie intake by a placed character, a predetermined award may be granted to a player who has placed the character by which the remaining calories has been reduced to zero. For example, the player point count may be recovered to the maximum value as an award. Another example of an award may be an item to favorably advance the game. The player to which an award is granted may not be limited to a player who has placed the character by which the remaining calories has been reduced to zero; other players who had placed a character in the area before that player may also be granted. In this case, an award may be granted to each player according to the calories taken in the area (according to the degree of contribution to calorie intake in the area).

After execution of the point granting and character removing processing (step P108), whether to start the Oshikura mode, in which each player can select a player point count corresponding to the action Oshikura, may be determined (step P110). In an embodiment, if the elapsed time from the start of the game has reached a predetermined time (30 minutes, for example) and characters have been already placed in all areas in the game field, the Oshikura mode may be started (step P110a). If the elapsed time from the start of the game has not yet reached the predetermined time or the game field includes at least one area in which a character has not been placed, the Oshikura mode may not be started or may be terminated if the Oshikura mode has been already started (step P110b). Once the Oshikura mode has been started, even if a situation occurs in which there is an area in which no character is placed, the Oshikura mode may be continued instead of being terminated.

When the game content drawing processing (step P104), game content placing processing (step P106), and point granting and character removing processing (step P108) are repeatedly executed as described above, the obtaining of a character by each player, the placement of the obtained character in an area, calorie intake according to the elapsed time, and character removal may be repeatedly carried out.

If a predetermined condition to terminate the game holds (step P112), game result determining processing to determine a game result may be executed (step P114). In an embodiment, the game may be terminated when a predetermined game termination time is reached. In an embodiment, the game may also be terminated when the remaining calories fall to zero in all areas even before the predetermined game termination time is reached. Of course, the game termination condition may be another condition. In the game result determining processing (step P114), calorie intake by each player may be compiled for each team and whether the team has won or lost may be determined according to the number of calories taken by the team. Specifically, calorie intake by each team may be complied by using the team ID to compile the cumulative calories stored in the player management table 52d for each team.

As described above, an embodiment of the present invention may provide an area capturing game that may use a game field including a plurality of areas; in the game, each player may place a character obtained by drawing in an area, and if a character has been already placed in the area by another player, which character to place in the area may be determined by value information (player points) entered by the player and value information entered by the other player; a plurality of players may play against one another to obtain points (calorie intake) in the area in which the character has been placed. Accordingly, a game that can achieve more competitive game elements can be provided in which a battle can be performed through a comparison with value information entered by other players for characters while the game maintains a view of the world and a feeling of manipulations realized in, for example, farm games in which an area in a game field is selected and an action is taken. Since the Oshikura mode is started if the predetermined time has elapsed from the start of the game and characters are already placed in all areas in the game field, the player can have a sense of anticipation and game characteristics can be more improved.

Although, in as embodiment, a character to be placed in an area by a player has been determined by drawing, another method may be used to determine the character. For example, a plurality of game contents held by a player may be managed in advance, and a game content to be placed may be determined from the plurality of game contents according to a predetermined rule (an order preset by the player, for example).

In the determination of a character to be placed in an area according to the choice corresponding to the action Oshikura in an embodiment, player point counts entered by players during character placement have been compared and a character corresponding to a player having more player points has been placed, and if the player point counts are the same, either character has not been placed, but this is not a limitation to the method of determining a character to be placed. If, for example, the player point counts are the same, the already-placed character may be continued to be placed. Conversely, the already-placed character may be removed and a new character may be placed. In addition, a character to be placed may not need to be determined according to the result of the comparison of player point counts. For example, parameters of characters (which may be the standard caloric intake speed in an embodiment or may be other parameters) may be compared to determine a character to be placed. Furthermore, parameters to be compared may not need to be numeric. For example, players may select parameters that can determine superiority and inferiority among them, such as "scissors, paper, rock" in a hand game during area placement (or the players may set these parameters as parameters of characters) to determine a character to be placed according to superiority and inferiority among the parameters.

Although, in an embodiment, the Oshikura mode has been started if the elapsed time from the start of the game has reached a predetermined time and characters are already placed in all areas in the game field, this is not a limitation to the condition to start the Oshikura mode. For example, the Oshikura mode may be started if characters are already placed in all areas, regardless of the elapsed time from the start of the game. Alternatively, Oshikura mode may be started if the elapsed time from the start of the game has reached a predetermined time, regardless of whether characters have been already placed in all areas. Alternatively, the action Oshikura may be always selected without setting a condition as described above.

Although, in an embodiment, game contents have been exemplified by characters, this is not a limitation; of course, game contents may include electronic cards, items, avatars, and all other types of electronic data used in games.

The processing and procedures described in this description have been realized as explicitly described in embodiments, but they may also be realized by software, hardware, or an arbitrary combination of software and hardware. Specifically, the processing and procedures described in this description may be realized by implementing logics equivalent to the processing in a medium such as an integrated circuit, a volatile memory, a non-volatile memory, a magnetic disk, or an optical storage. The processing and procedures described in this description can also be realized by implementing the processing and procedures as computer programs and having a type of computer to execute the computer programs.

Even if there is a description that processing and a procedure described in this description are executed by a single unit, a single piece of software, a single component, or a single module, the processing or procedure can be executed by a plurality of units, a plurality of pieces of software, a plurality of components, and/or a plurality of modules. Even if there is a description that data, a table, or a database described in this description is stored in a single memory, the data, table, or database can be stored in a distributed manner, in a plurality of memories in a single unit or in a plurality of memories distributed in a plurality of units. The software elements and hardware elements described in this description can also be realized by being integrated into fewer constituent elements or divided into more constituent elements.

If a constituent element in the present invention is described as a single constituent element or a plurality of constituent elements or even if the constituent element is described without limiting to a single constituent element or a plurality of constituent elements, the constituent element may be a single constituent element or a plurality of constituent elements, unless the context otherwise requires.

What is claimed is:

1. A game providing device for providing a game, the device comprising:
    a central processing unit configured to execute machine-readable instructions; and
    storage unit configured to store machine-readable instructions that, when executed, cause the central processing unit to:
    store information about a plurality of game contents used in a game;
    store information about a plurality of areas, wherein the plurality of game contents are to be placed in the plurality of areas;
    determine, in response to a request from each of a plurality of players including a first player and a second player, a corresponding game content is available to the player from the plurality of game contents such that a first game content is determined to be available to the first player and a second game content is determined to be available to the second player;
    accept, from each of the plurality of players, a selection of an area from the plurality of areas, wherein the determined game contents are to be placed in the selected area;
    place the first game content in the area selected by the first player if the area has no game content placed therein, and perform placing processing based on a comparison between a first parameter corresponding to game content placement by the first player and a second parameter corresponding to game content placement by the second player, if the area selected by the first player is a competing area having the second game content placed therein by the second player;
    when first prescribed conditions are satisfied, remove the game content such that the area in which the game content has been placed is vacant, the first prescribed conditions including a condition that the elapsed time from when the game content has been placed in the area has reached a predetermined upper time limit;
    grant points corresponding to the area selected by the first player, in response to the placement of the game content in the area by the first player being successful; and
    decide a result of the game according to points granted to each of the plurality of players,
    wherein when second prescribed conditions including a condition that all of the plurality of areas are competing areas are satisfied, a selection of the competing area to be accepted as an area for placement of the determined game content is enabled.

2. The device according to claim 1, wherein the placing processing includes at least one of processing to place the first game content in the competing area instead of the second game content, processing to cause the second game content to continue to be placed in the competing area, and processing to remove the second game content from the competing area.

3. The device according to claim 1, wherein the central processing unit is further caused by the machine-readable instructions to determine superiority and inferiority between the first parameter and the second parameter according to a prescribed rule and to perform the placing processing according to the superiority and inferiority.

4. The device according to claim 3, wherein:
the first parameter and the second parameter include a numeric value; and
the superiority and inferiority is determined according to a magnitude relation between the first parameter and the second parameter.

5. The device according to claim 3, wherein if the first parameter holds superiority over the second parameter, the first game content is placed in the competing area instead of the second game content.

6. The device according to claim 3, wherein if the second parameter holds superiority over the first parameter, the second game content is caused to continue to be placed in the competing area.

7. The device according to claim 3, wherein if the first parameter and the second parameter are at the same level, the second game content is removed from the competing area.

8. The device according to claim 1, wherein the central processing unit is further configured, by the machine-readable instructions, to accept value information entered by the player for placement of the game content in the area, wherein
the first parameter and the second parameter includes the value information.

9. The device according to claim 1, wherein the game content is determined as being available to the player by drawing.

10. A non-transitory computer-readable storage medium storing a program for causing a computer to function as a game providing device for providing a game, the computer being operable to access a content information storage unit configured to store information about a plurality of game contents used in a game and an area information storage unit configured to store information about a plurality of areas, wherein the plurality of game contents are to be placed in the plurality of areas, the program causing the computer to:
determine, in response to a request from each of a plurality of players including a first player and a second player, a corresponding game content is available to the player from the plurality of game contents;
accept, from each of the plurality of players, a selection of an area from the plurality of areas stored in the area information storage unit, wherein the determined game contents are to be placed in the selected area;
place the first game content in the area selected by the first player if the area has no game content placed therein, and perform placing processing based on a comparison between a first parameter corresponding to game content placement by the first player and a second parameter corresponding to game content placement by the second player, if the area selected by the first player is a competing area having the second game content placed therein by the second player;
when first prescribed conditions are satisfied, remove the game content such that the area in which the game content has been placed is vacant, the first prescribed conditions including a condition that the elapsed time from when the game content has been placed in the area has reached a predetermined upper time limit;
grant points corresponding to the area selected by the first player, in response to the placement of the game content in the area by the first player being successful; and
decide a result of the game according to points granted to each of the plurality of players,
wherein when second prescribed conditions including a condition that all of the plurality of areas are competing areas are satisfied, a selection of the competing area to be accepted as an area for placement of the determined game content is enabled.

* * * * *